US009400395B2

(12) United States Patent
Travers et al.

(10) Patent No.: US 9,400,395 B2
(45) Date of Patent: Jul. 26, 2016

(54) CONTROLLABLE WAVEGUIDE FOR NEAR-EYE DISPLAY APPLICATIONS

(75) Inventors: Paul J. Travers, Honeoye Falls, NY (US); Robert J. Schultz, Farmington, NY (US)

(73) Assignee: Vuzix Corporation, Rochester, NY (US)

( * ) Notice: Subject to any disclaimer, the term of this patent is extended or adjusted under 35 U.S.C. 154(b) by 146 days.

(21) Appl. No.: 14/342,013

(22) PCT Filed: Aug. 29, 2012

(86) PCT No.: PCT/US2012/052947
§ 371 (c)(1),
(2), (4) Date: Apr. 17, 2014

(87) PCT Pub. No.: WO2013/033274
PCT Pub. Date: Mar. 7, 2013

(65) Prior Publication Data
US 2014/0300966 A1 Oct. 9, 2014

Related U.S. Application Data

(60) Provisional application No. 61/528,611, filed on Aug. 29, 2011.

(51) Int. Cl.
G02B 6/34 (2006.01)
G02B 27/42 (2006.01)
G02B 27/01 (2006.01)
G02B 27/00 (2006.01)
(Continued)

(52) U.S. Cl.
CPC .............. *G02B 27/42* (2013.01); *G02B 6/0035* (2013.01); *G02B 27/0081* (2013.01);
(Continued)

(58) Field of Classification Search
None
See application file for complete search history.

(56) References Cited

U.S. PATENT DOCUMENTS 6,580,529 B1 * 6/2003 Amitai ..................... G02B 5/32
359/13
6,805,490 B2 * 10/2004 Levola ................. G02B 5/1866
359/13

(Continued)

FOREIGN PATENT DOCUMENTS

| CN | 101589326 A | 11/2009 |
| WO | 2008081070 A1 | 7/2008 |
| WO | 2011051660 A1 | 5/2011 |

OTHER PUBLICATIONS

English translation of S.I.P.O. Office Action and Search Report of Sep. 14, 2015 from counterpart Chinese Application No. 201280052952.7.

*Primary Examiner* — Sung Pak
(74) *Attorney, Agent, or Firm* — Thomas B. Ryan; Harter Secrest & Emery LLP

(57) ABSTRACT

A near-eye display includes an image generator that generates angularly related beams over a range of angles for forming a virtual image and a waveguide that propagates the angularly related beams over a limited range of angles. An input aperture of the waveguide includes a plurality of controllable components that are selectively operable as diffractive optics for injecting subsets of the angularly related beams into the waveguide. An output aperture of the waveguide includes a plurality of controllable components that selectively operable as diffractive optics for ejecting corresponding subsets of the angularly related beams out of the waveguide toward an eyebox. A controller synchronizes operation of the controllable components of the output aperture with the propagation of different subsets of angularly related beams along the waveguide for ejecting the subsets of angularly related beams out of the waveguide for presenting the virtual image within the eyebox.

35 Claims, 8 Drawing Sheets

(51) Int. Cl.
*F21V 8/00* (2006.01)
*G03B 21/28* (2006.01)

(52) U.S. Cl.
CPC ....... *G02B 27/0101* (2013.01); *G02B 27/0172* (2013.01); *G02B 27/4205* (2013.01); *G02B 27/4272* (2013.01); *G02B 6/0015* (2013.01); *G02B 2027/0125* (2013.01); *G03B 21/28* (2013.01)

(56) References Cited

U.S. PATENT DOCUMENTS

| | | | | |
|---|---|---|---|---|
| 7,205,960 B2* | 4/2007 | David | .................. | G09G 5/06 345/204 |
| 8,320,032 B2* | 11/2012 | Levola | .................. | G02B 5/1814 359/13 |
| 8,548,290 B2* | 10/2013 | Travers | .................. | G02B 27/01 359/34 |
| 2004/0109234 A1 | 6/2004 | Levola | | |
| 2006/0066939 A1* | 3/2006 | Kimura | .................. | G02B 26/02 359/321 |
| 2006/0132914 A1* | 6/2006 | Weiss | .................. | G02B 5/32 359/462 |
| 2007/0188837 A1* | 8/2007 | Shimizu | .................. | G02B 5/203 359/13 |
| 2008/0239420 A1* | 10/2008 | McGrew | .................. | G02B 5/1828 359/11 |
| 2010/0277803 A1* | 11/2010 | Pockett | .................. | G02B 27/4277 359/567 |

\* cited by examiner

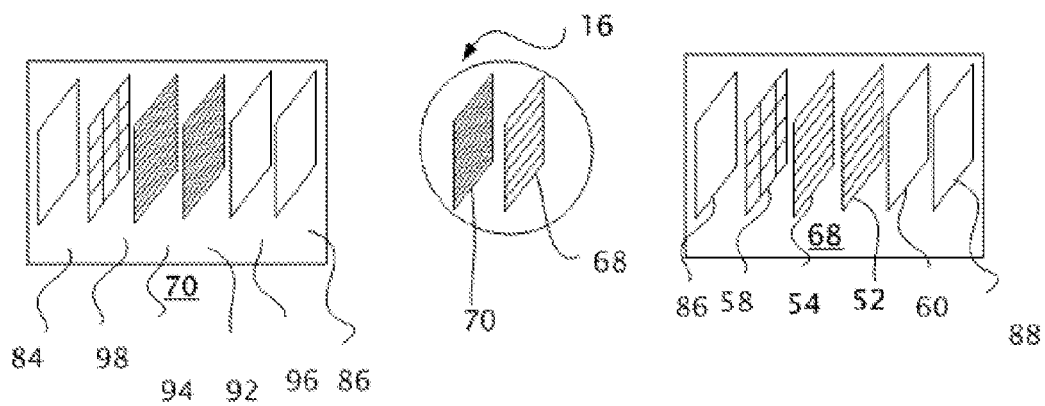
FIG. 3
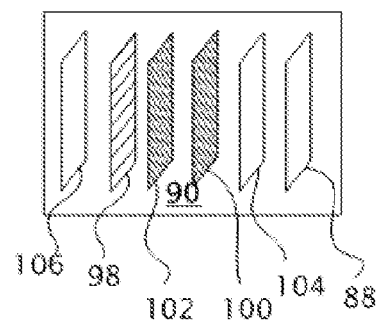
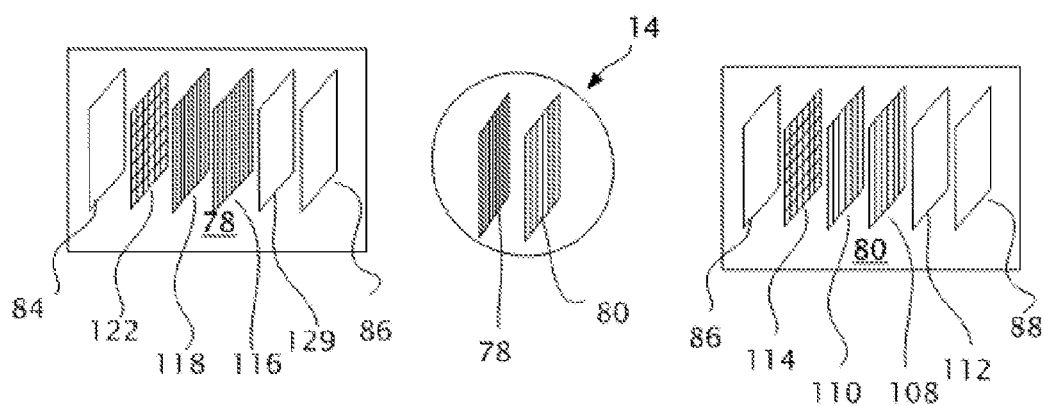

FIG. 7

CONTROLLABLE WAVEGUIDE FOR NEAR-EYE DISPLAY APPLICATIONS

TECHNICAL FIELD

The invention relates to waveguide systems for transmitting angularly encoded image information, particularly for near-eye displays and to the use of controllable apertures for such purposes as optimizing viewing conditions and image quality and supporting multiple spectral ranges and multiple field angles ranges for presenting virtual images within exit pupils.

BACKGROUND OF THE INVENTION

Plate-shaped (usually planar) waveguides have been used in compact near-eye displays for transmitting angular image information to viewers' eyes as virtual images from image sources located out of the user's line of sight. The image information is generally input near one end of the waveguides and is output near an opposite end of the waveguides. The image information propagates along the waveguides as a plurality of angularly related beams that are internally reflected along the waveguide. Diffractive optics have been used for injecting the image information into the waveguides through a range of angles that are internally reflected by the waveguides as well as for ejecting the image information through a corresponding range of angles for relaying or otherwise forming exit pupils behind the waveguides in positions that can be aligned with the viewers' eyes.

Many of the waveguide displays have been limited to the use of monochromatic light in which the virtual images are formed in a single color. Conventional diffractive optics tend to diffract different wavelengths through different angles, creating chromatic aberrations. Multiple waveguides (e.g., stacked waveguides) or more complex diffractive optics have been used to mitigate these aberrations but current solutions tend to overly limit the number of wavelengths or the different angles through which the image information can be effectively transmitted.

The effective exit pupil size within which the virtual images can be seen in a prescribed position behind the waveguides (i.e., within a designed eyebox) is often overly limited because the diffracted light beams tend to spread apart upon leaving the planar waveguides. This limits the region of overlap within which the virtual image can be seen (i.e., reduces the size of the eyebox). Variations in the diffraction efficiency of the output diffractive optics with position have been used to expand the exit pupils (i.e., eyeboxes) but these variations do not tend to be effective for managing both the multiple angles and multiple wavelengths by which color virtual images are encoded.

Some planar optic displays are also intended to support views of the ambient environment within the same eyebox. This requirement places additional burdens on the output optics to maintain some level of transmissivity.

SUMMARY OF THE INVENTION

The invention in one or more of its preferred embodiments features a waveguide for near-eye displays containing at least one controllable aperture having addressable transformable components. Electronic controls provide for shifting each transformable component within the aperture between active and passive states, as well as where desirable through intermediate states of efficiency. Combining multiple addressable transformable components to create controllable apertures allows for the selective handling of specific ranges of beam angles and wavelengths. The control (including duration of activation) of each of the transformable components can be optimized for specific ranges of angles and wavelengths providing expanded viewing areas and enhanced quality of virtual images relayed through waveguides.

A version of the invention as a near-eye display includes a waveguide that propagates angularly related beams over a limited first range of angles and an image generator that generates angularly related beams over a second wider range of angles for forming a virtual image. An input aperture of the waveguide includes a plurality of controllable components. Each of the controllable components of the input aperture is selectively operable as a diffractive optic for injecting a subset of the angularly related beams over a limited portion of the second range of angles for propagating the subset of angularly related beams along the waveguide within the first range of angles. An output aperture of the waveguide includes a plurality of controllable components. Each of the controllable components of the output aperture is selectively operable as a diffractive optic for ejecting a corresponding subset of the angularly related beams out of the waveguide toward an eyebox. A controller synchronizes operation of the controllable components of the output aperture with the propagation of different subsets of angularly related beams along the waveguide for ejecting the subsets of angularly related beams out of the waveguide and presenting the virtual image within the eyebox.

Each of the controllable components of the input aperture is preferably paired with one of the controllable components of the output aperture for injecting and ejecting one of the subsets of angularly related beams. The controllable components of the input and output aperture preferably comprise a plurality of transformable diffractive optics having different effective periods for diffracting the different subsets of angularly related beams through different angles. The transformable diffractive optics are preferably transformable between a first state that is substantially transparent to the subsets of angularly related beams and a second state that diffracts the subsets of angularly related beams according to their period.

Preferably, the image generator provides for generating the angularly related beams in a plurality of different nominal wavelengths. Each of the controllable components of the input aperture provides for injecting a subset of the angularly related beams in one of the plurality of different nominal wavelengths, and each of the controllable components of the output aperture is operable for ejecting a corresponding subset of the angularly related beams in one of the plurality of different nominal wavelengths for overlapping the subsets of angularly related beams in the different nominal wavelengths within the eyebox. The controller preferably provides for synchronizing operation of the controllable components of the input and output apertures with the operation of the image generator for sequentially injecting and ejecting the subsets of angularly related beams of different nominal wavelengths into and out of the waveguide. For supporting a view of the ambient environment from the eyebox through the output aperture of the waveguide, the controller transforms the controllable output components of the output aperture into the first state.

The waveguide can also incorporate an intermediate diffractive optic having sections sections located along the waveguide between the input and output apertures for selectively reorienting the subsets of angularly related beams toward the output aperture. The sections of the intermediate diffractive optic spatially separate the subsets of angularly related beams.

Another version of the invention as a waveguide of a near-eye display includes a plate-shaped body having a front surface facing an ambient environment, a back surface facing an eyebox, and a length for propagating angularly related beams by successive reflections from the front and back surfaces over a limited range of angles. An input aperture of the plate-shaped body includes a plurality of controllable components for collectively receiving angularly related beams over multiple wavelengths that define a pupil of a virtual image generator and for individually injecting subsets of the angularly related beams over the multiple wavelengths into the plate-shaped body within the limited range of angles. An output aperture of the plate-shaped body includes a plurality of controllable components for individually receiving the subsets of angularly related beams over the multiple wavelengths and for collectively ejecting the subsets of angularly related beams over the multiple wavelengths from the waveguide. Each of the controllable components of the input and output apertures comprise a transformable diffractive optic that is transformable between a first state that is substantially transparent to the subsets of angularly related beams over the multiple wavelengths and a second state that diffracts one or more of the subsets of angularly related beams over the multiple wavelengths. A controller synchronizes transformations of the controllable components of the input and output apertures for sequentially injecting and ejecting the subsets of angularly related beams over the multiple wavelengths within an integration interval of the viewer's eye for collectively re-forming the pupil of the virtual image generator within the eyebox.

Preferably, the controllable components of the output aperture provide for sequentially ejecting corresponding subsets of the angularly related beams in the different wavelengths within the integration interval of the viewer's eye for collectively re-forming the pupil of a color virtual image generator within the eyebox.

The transformable diffractive optics preferably include transformable grating structures paired with mating grating structures within individual components of the input and output apertures. An electro-active material of the transformable grating structures preferably has an index of refraction that can be varied from a value that substantially matches an index of refractive index of the paired mating grating structures to another value that does not substantially match the refractive index of the paired mating grating structures for transforming the controllable components between the first and second states. The controller preferably provides for transforming the controllable output components of the output aperture between the first and second states for simultaneously supporting both a view of the ambient environment and a view of a virtual image produced by the virtual image generator from within the eyebox.

Another version of the invention as a method of relaying an exit pupil of an image generator through a waveguide to an eyebox includes generating angularly related beams over a range of angles that form an exit pupil of an image generator. An input aperture of a waveguide is located proximate to the exit pupil of the image generator for receiving the angularly related beams. Controllable components of the input aperture are transformed between a first state that is substantially transparent to the angularly related beams and a second state that diffracts the angularly related beams for individually injecting subsets of the angularly related beams into the a waveguide for propagation along the waveguide within a narrower range of angles. An output aperture of the waveguide is located proximate to an eyebox. Controllable components of the output aperture are transformed between the first state that is substantially transparent to the angularly related beams and the second state that diffracts the angularly related beams for individually ejecting the subsets of the angularly related beams from the waveguide into the eyebox over a range of angles that re-form the exit pupil of the image generator within the eyebox.

The durations of transformations of the controllable components of the input and output apertures can be timed among the first and second states for balancing intensities across an image field that is viewable at the re-formed exit pupil. In addition or alternatively, the diffraction efficiencies of the second states of the controllable components of the input and output apertures can be controlled for balancing the intensities across the image field.

In addition to generating the angularly related beams over a range of angles, the angularly related beams are also preferably generated over a range of wavelengths that form the exit pupil of the image generator as a color image generator. As such, and the steps of transforming include diffracting the angularly related beams in different wavelengths for individually injecting subsets of the angularly related beams in the different wavelengths into the a waveguide and diffracting the angularly related beams for individually ejecting the subsets of the angularly related beams in the different wavelengths from the waveguide into the eyebox over the range of angles and wavelengths that re-form the exit pupil of the color image generator within the eyebox.

BRIEF DESCRIPTION OF THE DRAWING FIGURES

FIG. 3 is an exploded view of all the controllable gratings in the near-eye display of FIG. 1

FIG. 7 is a representation of the patterned grating structure for the controllable gratings used in the near-eye display of FIG. 6.

DETAILED DESCRIPTION OF THE INVENTION

Figure 1:
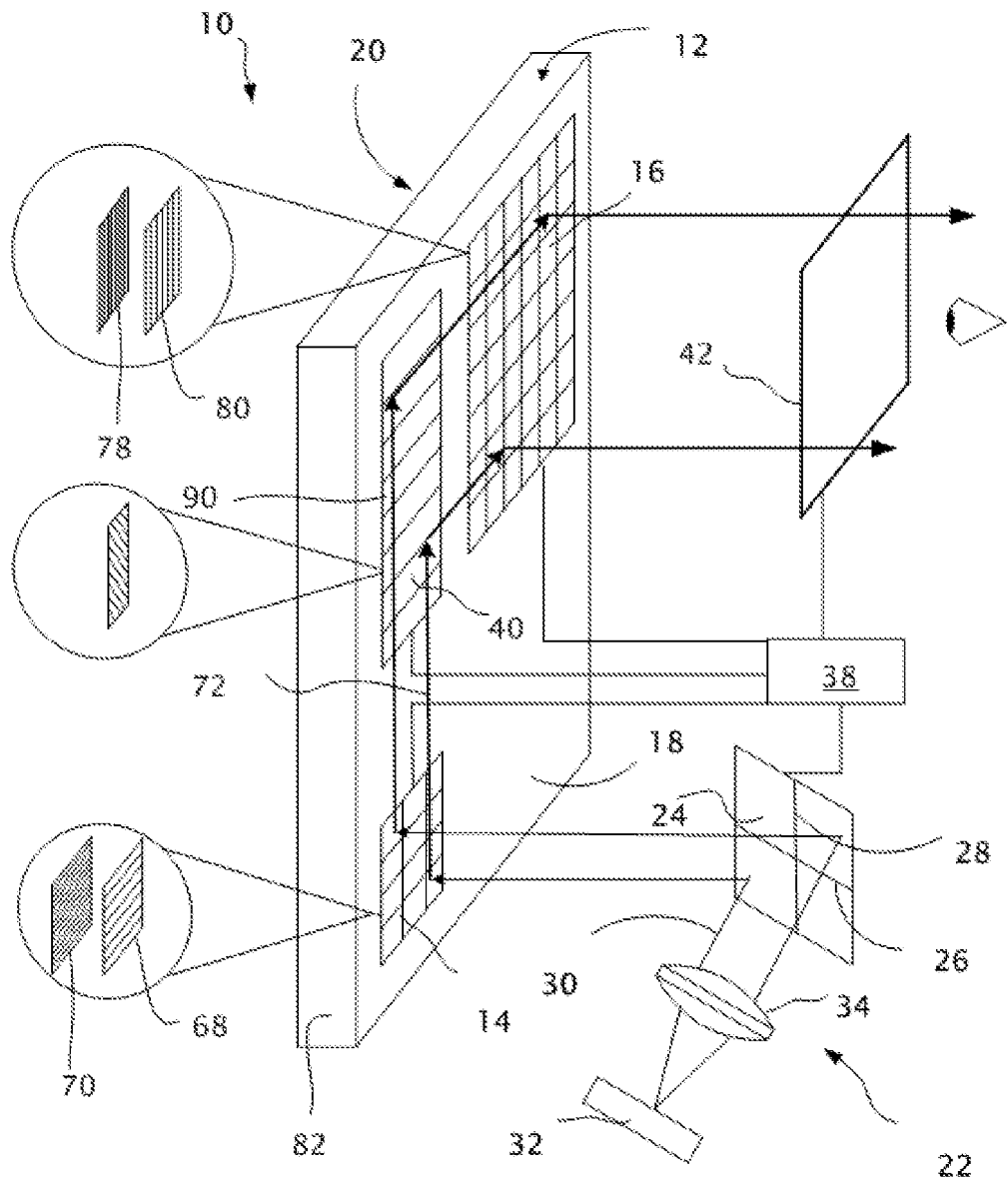
FIG. 1 is a diagrammatic view of a near-eye display including a plate shaped waveguide and stacked multiple controllable gratings for multiplexing angular information contained in the collimated input rays.

With reference to FIG. 1, a near-eye display 10 includes a plate-shaped waveguide 12 having a controllable input aperture 14, a controllable output aperture 16 and a controllable intermediate diffractive optic 90. The plate-shaped waveguide 12 is preferably a transmissive plate having a back surface 18 (facing the viewer's eye) and a front surface 20

(facing the ambient environment), with both the back and front surfaces 18 and 20 being exposed to air or another medium with a refractive index that is preferably close to the refractive index of air.

The plate-shaped waveguide 12 can be made of various transmissive optical materials, such as BK7 glass having a nominal refractive index of 1.527, and has dimensions for transmitting light to a position within the field of view of a viewer from an off-axis position at which the light can be injected. For example, the plate-shaped waveguide 12 can have a length of approximately 60 millimeters for reaching the eye position, a height of approximately 60 millimeters for managing a second dimension of the image, and a thickness of approximately 2 millimeters for supporting the propagation of light in a desired form while limiting the size and weight of the plate-shaped waveguide 12. Other waveguide dimensions, of course, can be used for particular applications for attending to the propagation of light from one position to another along the waveguide. While the plate-shaped waveguide 12 has a planar form, which simplifies propagation issues, the plate-shaped waveguide can also be curved to accommodate additional requirements, including aesthetic considerations.

FIG. 1 depicts the image generator 22 in a largely generic fashion including a light source 32, a collimating optic 34 and a mirror 24. The light source 32 can take a number of forms including a two-dimensional array of addressable pixels, a one-dimensional array of addressable pixels, or a single addressable light source, all addressable by a controller 38 in a conventional fashion for simultaneously or sequentially expressing the pixilated content of an intended image. The arrays can be formed, for example, by appropriately powered arrangements of liquid crystal diodes, micromirrors, or light emitting diodes.

The light source 32, as a two-dimensional array of addressable pixels, receives signals from the controller 38, which can be a conventional video controller, to form real images. The collimating optic 34 converts light from each pixel in the two-dimensional array into a collimated beam 30 that is angularly related to similar collimated beams from the other pixels of the array. That is, the collimating optic 34 collimates light from each pixel within the pixel array through a unique angle referenced in two dimensions corresponding to its spatial position within the two-dimensional pixel array. The mirror 24 redirects the collimated beam 30 from the referenced pixel, as well as the other angularly related collimated beams from the other pixels, toward the controllable input aperture 14. The mirror 24 is not needed if the collimate beams from the collimating optic 34 impinge directly on the controllable input aperture 14.

Alternatively, the light source 32 of the image generator 22 can be arranged as a one-dimensional (e.g., linear) array of addressable pixels, and the mirror 24 can be arranged as a scanning mirror that is pivotal in one dimension. The collimating optic 34 converts light from each pixel in the one-dimensional array into a collimated angularly related beam having a first angular component corresponding to the position of each pixel within the array, and the scanning mirror pivots the collimated beams associated with successive expressions of the pixels to contribute a second angular component corresponding to a second dimension of the intended image. The controller 38, which controls the addressable pixels within the one-dimensional array, pivots the mirror in synchronism with the successive expressions of the one-dimensional pixel array to produce a set of angularly related beam encompassing two dimensions of angular variation corresponding to pixel positions within the intended image.

The light source 32 can also be arranged as a single addressable light source, and the mirror 24 can be arranged as a scanning mirror 24 that is pivotable about two, preferably orthogonal, axes 26 and 28. The scanning mirror is illuminated by a single collimated beam 30 that is formed by the light source together with a collimating optic 34. The controller 38, which synchronizes the output of the light source to the angular position of the scanning mirror 24, individually generates each pixel of the generated image as one of a succession of angularly related beams corresponding to the pixel positions within the intended image.

Polychromatic (i.e., color) images can be produced by additional pixels within the arrays, multiple light sources having different nominal wavelengths, or by color filtering one or more broadband light sources. Although the pixels of the intended images can be generated as a succession of pixel subsets or even one pixel at a time, each such image is preferably generated within the integration interval of the viewer's eye so that each image can be viewed in its entirety or as otherwise intended. In general, the image generator 22 provides a Fourier transform of generated images (e.g., video images) intended for viewing as virtual images, where pixel position within an intended image is angularly encoded. As such, the collimated beams through different angles define an exit pupil of the image generator 22.

The controllable input aperture 14 of the waveguide 12 receives the collimated angularly related beams (e.g., the collimated beam 30) over a range of angles corresponding to the field of view of the generated image. However, the waveguide 12, which propagates light by such mechanisms as total internal reflection, may only support the propagation of a narrower range of beam angles. The controllable input aperture 14 is arranged to provide a multiplexing function whereby sub-ranges of the angularly related beams that define the images are separately injected into the waveguide 12 for further propagation within a narrower range of angles supported by the waveguide 12.

The controllable input aperture 14 comprises a stack of independently controllable diffractive components for separately injecting the sub-ranges of the angularly related beams for propagation along the waveguide 12 over at least partially overlapping portions of the narrower range of angles supported by the waveguide 12. With reference to FIG. 1, the controllable input aperture 14 includes a first controllable diffractive component 68 and a second controllable diffractive component 70, which are embedded in the waveguide 12. The diffractive characteristics of the two controllable diffractive components 68 differ for diffracting the sub-ranges of the angularly related beams through different angles so that both sub-ranges of angularly related beams are injected into the waveguide 12 for further propagation within the range of angles supported by the waveguide 12. More than two independently controllable diffractive components may be required to support a wider range of angularly related beams encoding a virtual image or to accommodate limited ranges of angles over which the independently controllable diffractive components are effective for diffracting light.

Figure 2:
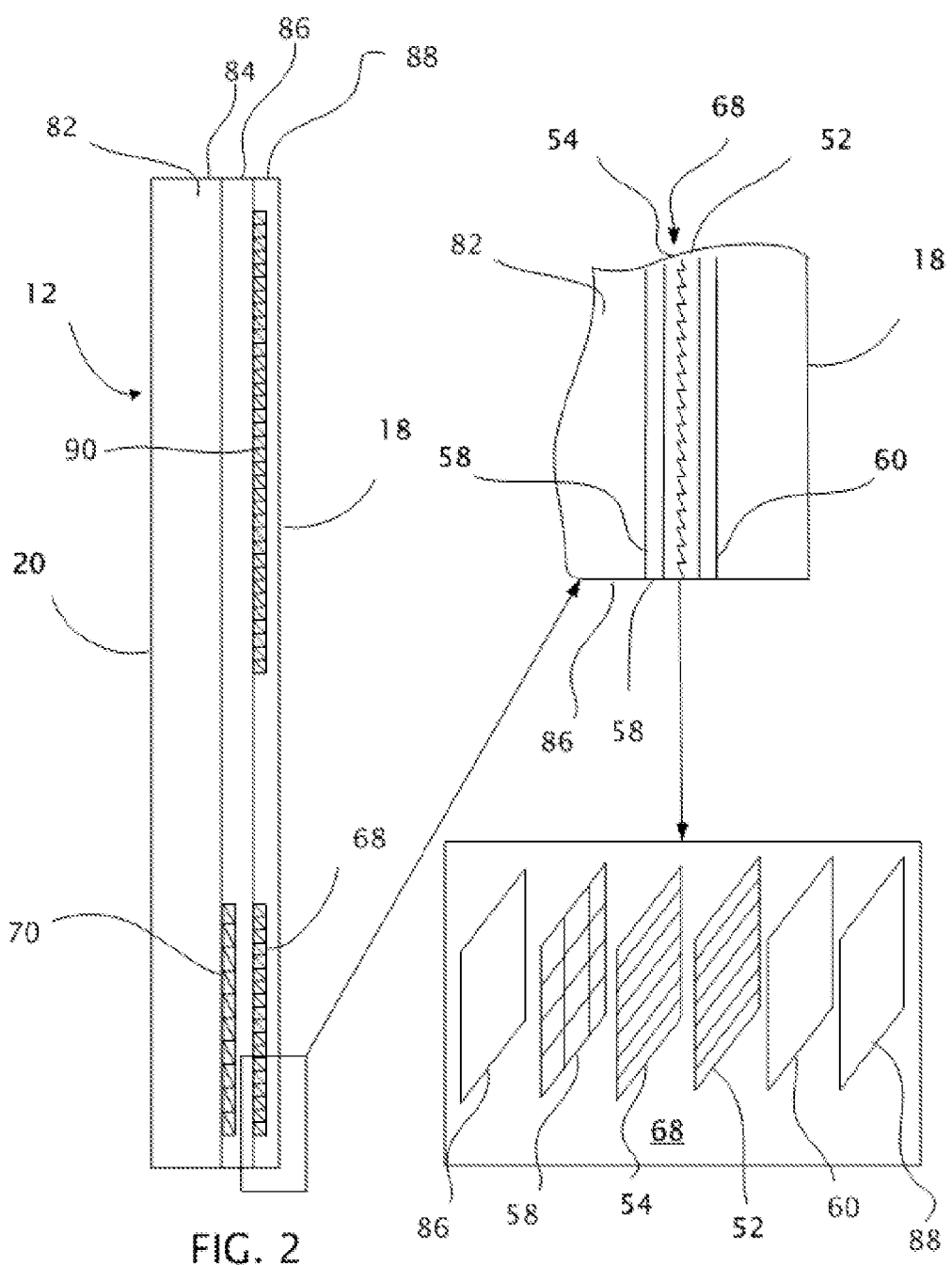
FIG. 2 is a cross sectional view of the plate shaped waveguide contained in FIG. 1.

The section view in FIG. 2 shows a preferred arrangement of the first controllable diffractive component 68. The first controllable diffractive component 68 includes a transformable grating structure 52 together with a mating (inverse) grating structure 54 such that in a passive state (i.e., deactivated state) of the transformable grating structure 52, the two grating structures 52 and 54 preferably form an optically homogenous layer. First and second conductive layers 58 and 60, such as may be formed by indium tin oxide (ITO), straddle the transformable grating structure 52 and may under the control of the controller 38 in FIG. 1 form an electrical field across the transformable grating structure 52 for modifying the effective refractive index of the electro-active material of the transformable grating structure 52 with respect to the mating grating structure 54.

The electro-active material of the transformable grating structure 52 preferably varies in an analog fashion between two different states, each with a different index of refraction, with the application of electric fields of different voltages. In the case of a liquid crystal material, the crystals rotate between an initial state and an orthogonal or extreme state with the application of a given voltage. If the liquid crystals are used in either of their orthogonal states, a polarized input source would be preferred, since incorrectly polarized light would not respond similarly to activated gratings. Using the liquid crystals in either of their orthogonal (extreme) states, activated or deactivated by the presence of some electric field, allows the grating to be effectively present or not present in the waveguide 12. The quantity of light diffracted by the grating structure 52 can be controlled by the amount of time the grating 52 is left in an active state.

Alternatively, if the voltage applied across grating structure 52 were set to some level that was not sufficient to fully turn the liquid crystals into an orthogonal or extreme state, the diffraction efficiency of the grating would be reduced. The response of many liquid crystal materials departs from a linear or analog response, particularly since polarized light passing through the liquid crystal at an intermediate state is likely to change polarization states. However, a corrective layer can be used to restore the majority of light to its correct polarization. Such a corrective layer could itself be arranged as a dynamically adjustable liquid crystal (another active layer much like the grating layer without the patterning) or in a static way by incorporating birefringence into the waveguide body 12. Thus, the quantity of light diffracted by the grating can also be controlled by the amount the liquid crystal material is rotated through intermediate non-orthogonal or non-extreme states, although some polarization correction may be required to achieve a desired range of intermediate responses.

Referencing FIG. 2, the plate-shaped waveguide 12 can be formed by stacking three separate layers 84, 86 and 88 of the desired substrate to form the complete waveguide 12. The detail window in FIG. 2 shows that the first controllable diffractive component 68 is sandwiched between substrate layers 86 and 88. First and second conductive layers 58 and 60 are deposited onto the interior surfaces of substrate layers 86 and 88. The mating grating structure 54 is then fixed to the substrate layer 86 on top of the patterned conductive layer 58 providing a mold form for shaping the electro-active material that forms the transformable grating structure 52. Substrate layer 86 and 88 can then be stacked and affixed with the proper orientation thereby forming controllable diffractive component 68. The mating grating structure 54 is preferably formed from a solid optical material similar to conventional gratings. For example, the illustrated mating grating structure 54 is formed by a stamped epoxy having a nominal refractive index of 1.5 and a pitch of approximately 0.5 microns. The stamped grating has a length of approximately 20 millimeters, a width of approximately 20 millimeters, and a depth of about one micron. The transformable grating structure 52 is preferably formed by an electro-active material, such as a liquid crystal material, that fills a space between the mating grating structure 54 and the substrate layer 88.

The electro-active material can be a nematic liquid crystal mixture BL037 that is switchable between a refractive index of 1.526 (matching the index of the waveguide) to a refractive index of 1.808. The substrate layers 84, 86 and 88 can be formed from a transmissive optical material, such as BK7 glass having a thickness of approximately 0.5 millimeters. The materials can be matched and the dimensions can be scaled to the particular requirements of other applications.

At least one of the conductive layers 58 and 60 is preferably deposited or otherwise arranged in a pattern for activating all or a limited portion of the controllable diffractive component 68. For example, if arranged to form the separate areas of a grid, individual sections of the controllable diffractive component 68 can be activated for limiting the spatial effect of the activated diffractive component in a plane parallel to the back and front surfaces 18 and 20 of the waveguide 12.

The first and second conductive layers 58 and 60 can be positioned between other layers so long as the appropriate electric field can be formed across the transformable grating structure 52. For example, the first conductive layer 58 could be formed at an interface between the transformable grating structure 52 and the mating grating structure 54. The order of the transformable and mating grating structures 52 and 54 can be reversed. The controller 38 controls the state of the transformable grating structure 52 between active and passive states (including the timing and duration of each state) and can also control the field strength for varying the refractive index of the transformable grating structure 52 within the active state.

Preferably, the refractive indices of the first and second conductive layers 58 and 60, the transformable grating structure 52 in a passive state, and the mating grating structure 54, sufficiently match the refractive index of the plate-shaped waveguide 12 so that in the passive state of the transformable grating structure 52, the controllable diffractive component 68 functions similar to the plate-shaped waveguide 12 to allow the input beams to pass through grating 68 and strike the controllable grating 70. In other words, the transformable grating structure 52 is preferably essentially invisible across the visible spectrum in the passive state so that the controllable diffractive component 68 functions as if there was no diffraction grating present. Conversely, in an active state, the transformable grating structure 52 functions similar to a conventional diffractive optic of a given efficiency for directing specific sub-ranges angularly related image-bearing beams into the waveguide.

As shown in FIG. 3, the second controllable diffractive component 70 of the controllable input aperture 12 includes a similar arrangement comprising a transformable grating structure 92 together with a mating (inverse) grating structure 94 straddled by conductive layers 96 and 98. The controllable output aperture 14 also includes first and second controllable diffractive components 80 and 78, each arranged in a similar manner, comprising transformable grating structures 108 and 116, mating grating structures 110 and 118, paired conductive layers 112, 114, and 129, 122. The controllable intermediate diffractive optic 90 is also arranged in a similar manner with a transformable grating structure 100 and a mating grating structure 102, both straddled by conductive layers 104 and 98.

When constructing the waveguide 12, the controllable diffractive components 68 and 80, as well as the controllable intermediate diffractive optic 90 can be assembled between substrate layers 86 and 88 as described above. The controllable diffractive components 70 and 78 can be assembled between substrate layers 84 and 86. For simplifying or compacting the design, the substrate layers 84, 86, and 88 can be formed by sheets of ITO coated glass available in thicknesses less than 100 microns. The ITO coatings can be patterned for providing the paired conductive layers (60, 58), (96, 98), (100, 98), and (112, 122). Reducing the thickness of the substrate layers allows more controllable diffractive components to be stacked together within the controllable input and output apertures 12 and 14 while maintaining the waveguide 12 at a desirable thickness.

The efficiency of the first controllable diffractive component 68 can be optimized to diffract a sub-range of the angularly related beams, such as at higher incidence angles approaching the controllable input aperture 14, into the waveguide 12 for further propagation in vertical direction within the waveguide 12 by total internal reflection. The efficiency of the second controllable diffractive component 70 can be optimized to diffract another sub-range of the angularly related beams, such as at lower incidence angles approaching the controllable input aperture 14, into the waveguide 12 for further propagation in vertical direction within the waveguide 12 by total internal reflection. Each of the controllable diffractive components 68 and 70 can be toggled between an active and a passive state. In the active state, the controllable diffractive components 68 and 70 function as diffractive elements and redirect the light into the waveguide. In the passive state, the controllable diffractive components 68 and 70 are invisible and function as transparent elements allowing light to pass through unchanged.

Using the controller 38 to control the timing between the active and passive states of the controllable gratings 68 and 70, the controllable input aperture 14 can be used to selectively input different sub-ranges of the angularly related beams incident upon the controllable input aperture 14, i.e., subsections of the total field of view of the incoming virtual image. When the controllable diffractive component 68 is in the active state, the controllable diffractive component 70 is preferably in the passive state. This means only the higher incident angle beams will be diffracted into the range of angles supported for propagation along the waveguide 12 and the diffracted beams will pass through controllable diffractive component 70 without any further impedance or diffraction. Conversely, when controllable diffractive component 70 is in the active state, the controllable diffractive component 68 will be in the passive state. This means that controllable diffractive component 68 will be invisible and the input light will pass through controllable diffractive component 68 and encounter controllable diffractive component 70, which will diffract the lower angle incidence beams into the range of angles supported for propagation along the waveguide 12. This multiplexing of the angular information (i.e., angularly related beams) of the input image by the controllable diffractive components 68 and 70 increases the maximum field of view that can be injected into the waveguide 12 in such a way that further propagation of the angular information along the waveguide 12, such as by total internal reflection, can be maintained.

The multiplexed angular information of the input image that is diffracted vertically into the waveguide 72 is reoriented horizontally by the intermediate diffractive optic 90 for yet further propagation along the waveguide 12 toward the controllable output aperture 16. The detailed structure of the intermediate optic 90 can be seen in FIG. 3. The intermediate diffractive optic 90 can be dynamically controlled in much the same way as grating structures 68 and 70. Through patterning of one or both of the conductive layers 104 and 98 of the controllable diffractive optic 90 and by proper connections to controller 38, certain vertically displaced controllable sections 40 (FIG. 1) of the intermediate diffractive optic 90 can be active while other controllable sections remain inactive. In this way, certain angularly related beams can be selectively turned towards the output aperture 16 from different vertical locations, allowing the beams to propagate towards specific vertical areas of the controllable output aperture 16. By controlling the time that each controllable section of the intermediate diffractive layer 90 is active or by varying the effective refractive index of the electro-active material 100 through variations in the applied voltage, it is possible to balance the size and relative intensities of the angularly related beams that are directed towards the controllable output aperture 16. By limiting the range of wavelengths subject to diffraction, the intermediate diffractive optic 90 can be arranged in a single plane to support both input diffractive components 68 and 70. The controller 38, however, preferably maintains a relationship between active and inactive states of the input controllable diffractive components 68 and 70 and the individual controllable components of the intermediate grating structure 90 to spatially distribute the angularly related beams en route to the controllable output aperture 16.

The controllable output aperture 16 includes a first controllable diffractive component 78 and a second controllable diffractive component 80, which are embedded in the waveguide 12. The general structure and assembly of the controllable diffractive components 78 and 80 can be similar to the structure and assembly of the controllable components 68 and 70 with the exception that the diffractive components 78 and 80 of the controllable output aperture 16 are generally orthogonal to the diffractive components 68 and 70 of the controllable input aperture 14.

Generally, the multiplexed angular information 72 of the input image that is diffracted horizontally inside the waveguide 12 by the intermediate controllable diffractive optic 90 is further diffracted by the controllable output aperture in a direction orthogonal to the surfaces 18 and 20 of the waveguide 12 for ejection from the waveguide 12 the towards the eyebox 42. The controllable output diffractive components 78 and 80 or sections thereof are activated by the controller 38 synchronous with the controllable input diffractive components 70 and 68, respectively for separately injecting and ejecting the different sub-ranges of angularly related beams. Preferably, the pitch of the mating grating structures 108 and 110 within the output diffractive component 80 is closely matched to the pitch of the mating grating structures 52 and 54 within the input diffractive component 68, and the pitch of the mating grating structures 116 and 118 within the output diffractive component 78 is closely matched to the pitch of the mating grating structures 92 and 94 within the input diffractive component 70. That is, the controllable input and output diffractive components are preferably paired for injecting and ejecting common sub-ranges of the angularly related beams so that the sub-ranges of angularly related beams ejected from the waveguide 12 correspond to the sub-ranges of angularly related beams that are injected into the waveguide 12.

The sections 40 of the intermediate controllable diffractive optic element 90 can be used to spatially distribute the angularly related beams over different areas of the controllable output aperture 16 and sections of the controllable output aperture can be selectively activated in concert with both the controllable input diffractive components 68 and 70 and intermediate controllable diffractive optic element 90 to provide for overlapping the different angularly related beams within the eyebox 42.

The controller 68 synchronizes control over each of diffractive components so that the sub-ranges of angularly related beams injected into and ejected from the waveguide 12 cover an overall range of angularly related beams that is wider than the range of beams supported for propagation by the waveguide 12. The addressable diffractive components can be operated by the controller 38 in synchronism with the output of the image generator 22, such as the pivotable mirror 24, so that only the diffractive components needed to support a particular sub-range of angularly related beams through the waveguide 12 to the viewer's eye are activated at any particular moment in time. Based on the separate treatment of the different sub-ranges of angularly related beams, the addressable diffractive components can be used to balance the image intensity across the entire field. The diffractive components that are not needed at any particular moment remain inactive and are therefore not visible or operative within the waveguide 12.

The controllable diffractive components can be switched to a passive state when not needed to convey a particular sub-range of angles. For example, if an image is generated over just a portion of the image field, the diffractive components arranged for conveying the remainder of the field can remain in a passive state. This leaves the portions of the waveguide not actively diffracting light towards the eye box in a transmissive state that can better transmit light from the ambient environment into the eyebox 42.

Thus, a range of angularly related beams corresponding to the field angles of a generated image can be divided into sub-ranges and sequentially input into the waveguide 12 through controllable input aperture 14. Using the two input diffractive components 68 and 70, the full field is roughly split in half, with a first sub-range of angularly related beams diffracted into the waveguide 12 by the controllable diffractive component 68 and a second sub-range of angularly related beams diffracted into the waveguide 12 by the controllable diffractive component 70. The controllable diffractive optical element 90 redirects both sub-ranges of angularly related beams towards the controllable output aperture 16. The controllable diffractive component 80 diffracts the first sub-range of angularly related beams out of the waveguide 12 towards the eyebox and the controllable diffractive component 78 diffracts the second sub-range of angularly related beams out of the waveguide 12 towards the eyebox. Both sub-ranges of angularly related beams make use of the same range of angles supported for propagation within the waveguide 12, such as the range of angles that can be propagated along the waveguide 12 by total internal reflection. By multi-purposing, these angles supported by the waveguide 12, the potential field of view from a virtual image that can be supported by the physical limitations of the waveguide 12 can be significantly increased. The angularly related beams corresponding to the field angles of a virtual image can be divided into three or more sub-ranges for sequential propagation into and out of the waveguide 12 by adding more controllable diffractive components that are assembled in a similar manner, such as by forming additional overlapping layers of the waveguide 12.

Figure 4:
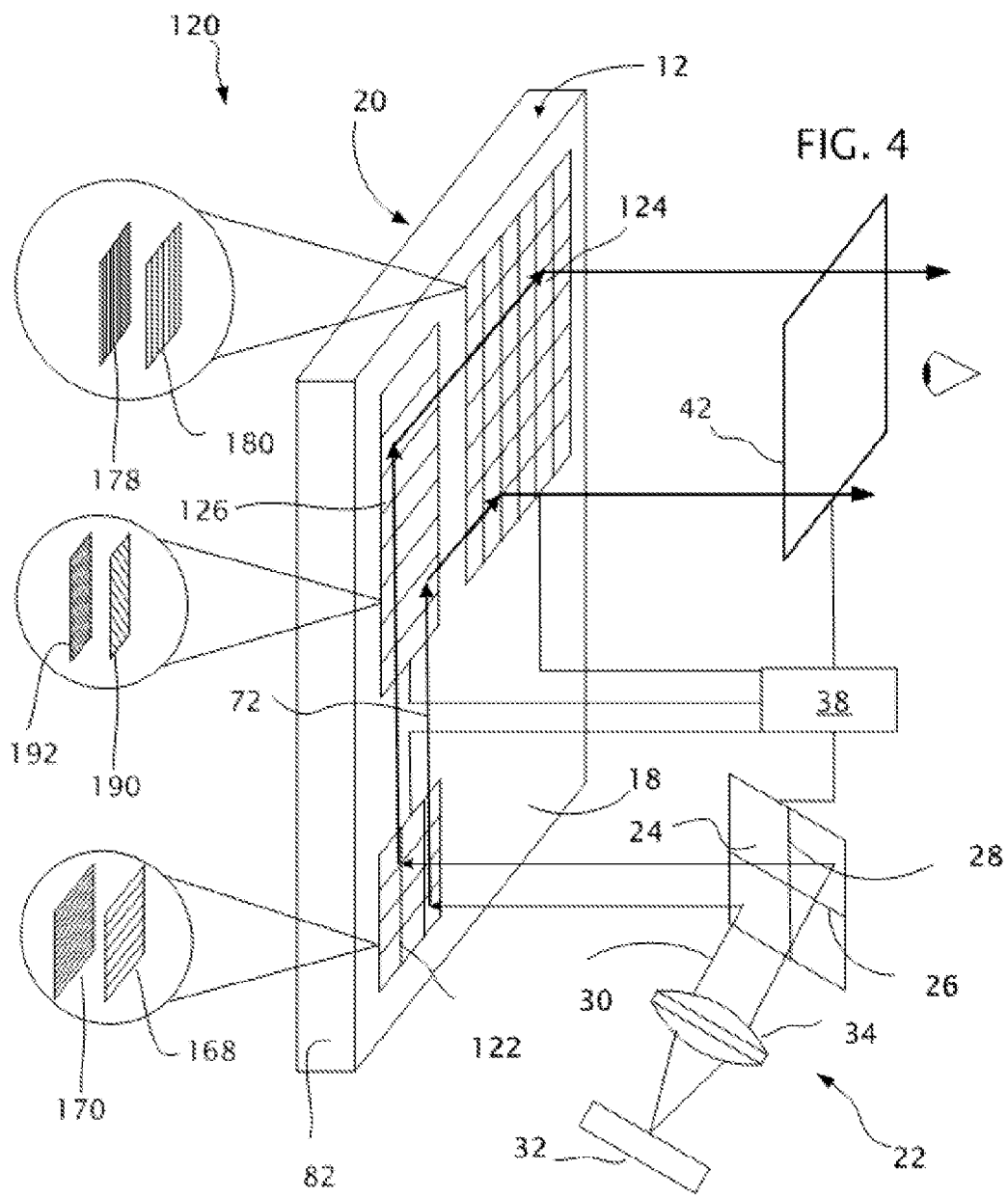
FIG. 4 is a is a diagrammatic view of a near-eye display including a plate shaped waveguide and stacked multiple controllable gratings for multiplexing spectral information contained in the collimated input rays.

A near-eye display 120, similar to the near-eye display 10 of FIG. 1, as shown in FIG. 4 includes a controllable input aperture 122 and a controllable output aperture 124 modified to multiplex the spectral information contained in the collimated input beam 30. The controllable input aperture 122 includes overlapping controllable diffractive components 168 and 170, and the controllable output aperture 124 includes overlapping controllable diffractive components 180 and 178. Elements of the near-eye display 120 in common with the near-eye display 10 share the same reference numerals.

In contrast with the earlier described display 10, the near-eye display 120 is specifically designed to multiplex at least two ranges of wavelengths. Adding more addressable diffractive components 168, 170 and 180, 178 would allow for multiplexing of still more spectral ranges, but for the sake of simplicity, only two layers of diffractive components are shown here. In further contrast to earlier described display 10, an intermediate diffractive optic 126 contains two controllable diffractive components 190 and 192 to compensate for the spectral separation of the collimated input rays redirected by controllable input aperture 122. Since the pitch of a grating required to turn a specific angle of light to a different predetermined angle is very wavelength dependent, different controllable intermediate gratings must also be used for each spectral range of wavelengths.

In the embodiment of near-eye display 10, the timing of a specific range of angles generated by a scanning source could be synchronized with a specific path through the waveguide by controller 38. In the current embodiment of the near-eye display 120, the controller 38 synchronizes the timing of various spectral ranges of the display illumination with the correct addressable component of the controllable input aperture 122, the controllable intermediate diffractive optic 126, and the controllable output aperture 124 in such a way that, in addition to the specific path, the correct gratings are active to support the current spectral content of the video image.

It is common for microdisplays to function in color sequential modes, so the timing circuitry from the display element simply needs to be read by the controller 38 to synchronize the correct grating structures with each other. Examples of color sequential displays can be found in DLP, LCOS, and LCD display technologies, and even LED or laser sources could be pulsed directly as imaging pixels in scanning systems.

Multiplexing various spectral ranges into the waveguide 12 in such a way that at any given moment an angularly related beam only sees one set of grating structures optimized for maximum performance over the specific spectral bandwidth helps to minimize mixing of wavelengths that can be present in so many traditional approaches to this issue.

Utilizing patterned and addressable conductive layers, much like as in the case of near-eye display 10, it is possible to control not only the diffractive component layer within each aperture that is active at any given moment, but the efficiency of each such diffractive component can be varied to balance the illumination intensity of a supported spectral range over any field angle in the output virtual image. In a scanned input system, the exact path and width of each angularly related beam can be controlled to balance the perceived illumination intensity both across the pupil for a specific field angle and across the entire field of the output virtual image. Similar to the near-eye display 10, the controllable diffractive components, including the components 178 and 180 of the controllable output aperture 124, can be left inactive when not actively refracting light. This leaves the waveguide 12 much more transparent for better viewing of the ambient environment from within the eyebox 42.

Figure 5:
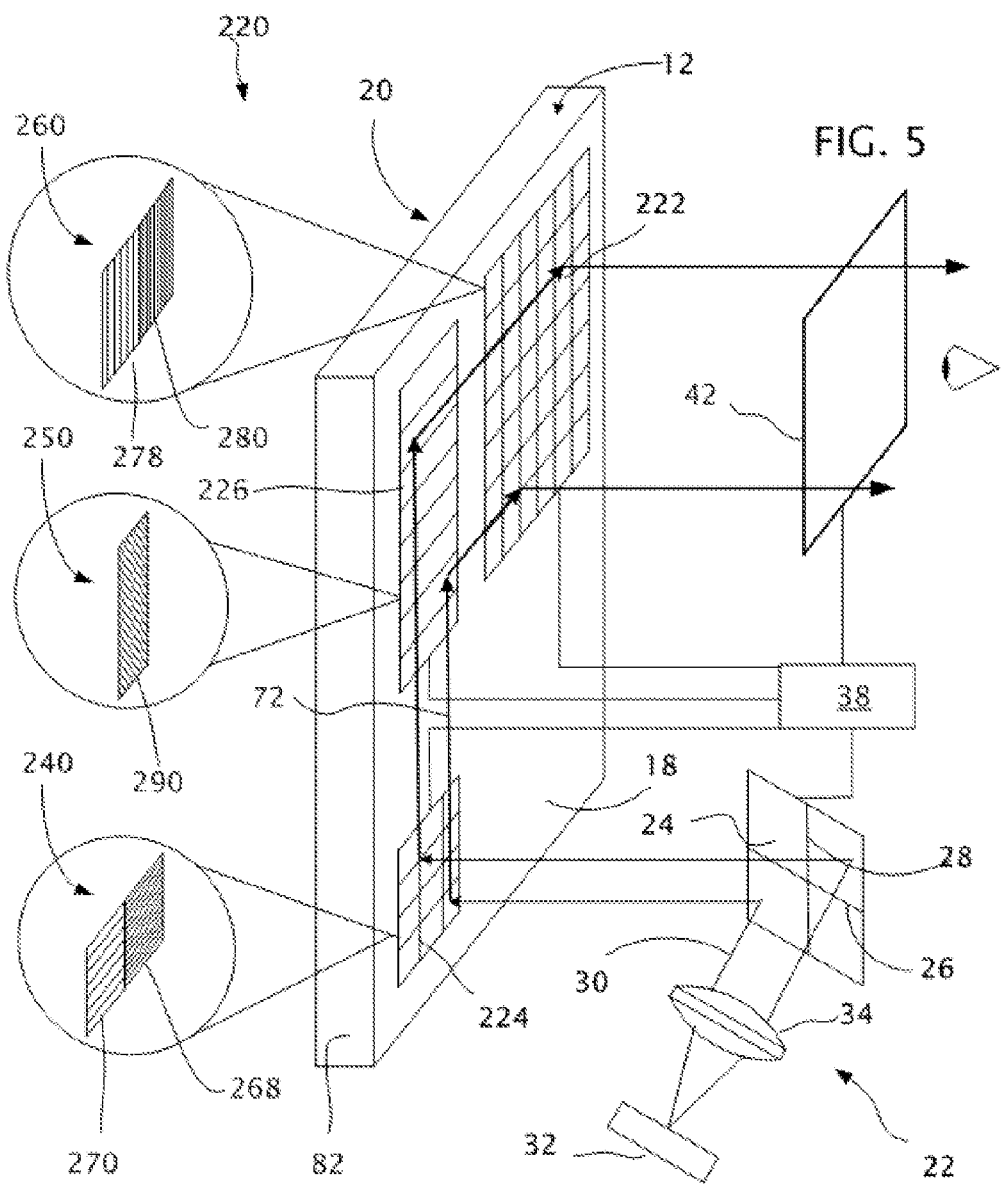
FIG. 5 is a diagrammatic view of a near-eye display including a plate shaped waveguide and multiple offset gratings for multiplexing angular information contained in the collimated input rays.

FIG. 5 shows a near-eye display system 220 as a further variation of the near-eye display system 10 pictured in FIG. 1. Near-eye display system 10 utilized stacks of controllable diffractive components positioned directly over each other within the body of the waveguide 12. With the use of almost any injection optics 34, whether they collimate a two dimensional display or a scanned system with a one-dimensional array or a point source, angularly related beams from specific field points in the virtual image have a tendency to separate as they move away from the collimating optic 34 or mirror 24. A correlation can be found between the amount and direction of drift in a specific angular beam with field angle in the virtual image.

This correlation can be used to advantage by relatively shifting controllable diffractive components in a direction parallel to the back and front surfaces 18 and 20 of the waveguide 12 in accordance with the drifting, or walking of the different angularly related beams within the field. FIG. 5 shows the near-eye display system 220 with a single stack of diffractive components that support only a single wavelength range, where the controllable diffractive input and output components 268, 270 and 280, 278 have been shifted laterally in relation to each other far enough that they can be located within the same layer of the waveguide 12.

The controllable diffractive input components 268 and 270 can be arranged to function almost identically to the controllable input components 68 and 70, respectively, of near-eye display 10. In addition, controllable diffractive output component 278 and 280 function almost identically to the controllable output gratings 78 and 80, respectively. The timing of the activation of the components would function similar to the components of the near-eye display 10. The similarities include the ability to balance the intensity across the image, direct scanned beams through a specific path within the waveguide 12, balance the size and uniformity across specific angular beams, turn off diffractive components that are not actively being used, and multiplex multiple ranges of angles into the waveguide 12.

Much like with near-eye display 10, it would be preferable to activate controllable diffractive components that are supporting the same range of beam angles at one time. The ranges of beam angles are still multiplexed into and out of the waveguide 12 with a separation in time, so that at a given moment there is only one range of beam angles present. This is because, much like before, the range of beam angles within the waveguide 12, where total internal reflection is supported, is being multipurposed and there could be crosstalk between the side-by-side controllable components within either the input or output controllable apertures 224 and 222 if they are allowed to be active simultaneously.

The benefits of near-eye display 220 over previous near-eye display 10 include a reduction in complexity. Having one stack is easier and generally less expensive to build than two stacks. Only one mold is needed for the gratings, rather than at least two for near-eye display 10. Parallelism within the stack is easier to maintain with fewer stacks. The entire waveguide can be made thinner, allowing the waveguide to be filled with image bearing light more uniformly, reducing shadows or dim spots across the field of the virtual image. Generally, having thinner waveguides 12 also reduces the overall size and weight of the system.

Figure 6:
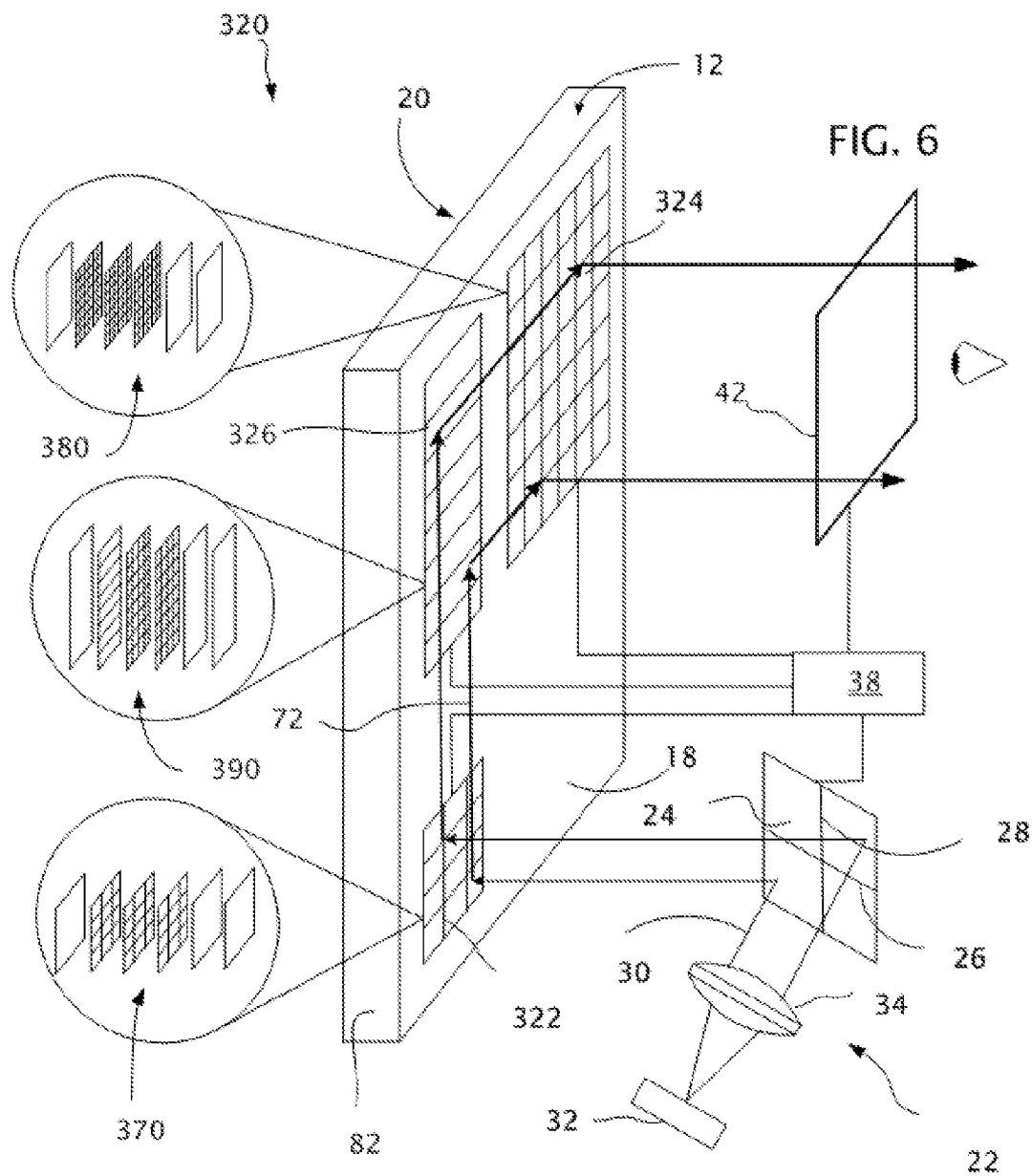
FIG. 6 is a diagrammatic view of a near-eye display including a plate shaped waveguide and multiple patterned offset gratings for multiplexing spectral information contained in the collimated input rays.

FIGS. 6 and 7 relate to another near-eye display system 320 that has only one layer of addressable diffractive components in similar fashion to near-eye display system 220. Where in near-eye display system 220 multiple ranges of angular information from a virtual image are multiplexed through the waveguide body 12, near-eye display system 320 multiplexes different spectral ranges of wavelengths through the waveguide and to the eyebox 42.

Whereas in near-eye display system 220 the controllable grating sub-apertures could be spatially separated due to the tendency of the angular beams to drift or walk with respect to field, there is no spatial correlation with respect to spectral information. For this reason, FIG. 7 shows an interleaved pattern that would be present in at least one of the conductive layers (in an addressable fashion) and within the patterned component itself Returning to near-eye display 120 of FIG. 4, each stack of controllable diffractive components functions over a different range of wavelengths. Control of the individual components was timed with the color sequential nature of the display source. Near-eye display 320 takes the same diffractive components and interleaves them as shown in FIG. 7, depending on the same sort of color sequential display scheme. This patterning allows different segments of the individual components that support the same wavelength range to be active at the same time.

For instance, all sectioned areas of diffractive components 322, 326, and 324 marked with $\lambda_1$ could be active at one particular moment in time, while all sectioned areas of the same diffractive components 322, 326, and 324 marked with $\lambda_2$ could be in a passive state. However, it may be preferable that the controller 38 only activate a portion of the total subset of diffractive components marked with $\lambda_1$. It may also be preferable that the efficiency of sectioned area of the diffractive components be independently controlled by 38, either through total time active or through variation in the electric field across the electro-active materials in the components for the purpose of balancing image intensity either across the whole of the virtual image or across the pupil in instances where the virtual image information is from a scanned source.

Although FIG. 7 shows only two spectral subsets, it is possible to interleave more spectral subsets within the same sectioned controllable diffractive components. LCD displays regularly use interleaved patterns of red, green, and blue color filters in their display systems. It should be noted, though, that although there is a correlation between components of the aperture and field, individual components of interleaved active grating do not necessarily correspond to a single pixel. It may be preferable to have multiple sections of the components open at a time, and in general, there are likely to be fewer sectional areas than there are active pixels in the display array. In effect, although there is a correlation with position, it is still the angular information that defines an individual pixel.

Again, recognizing that moving to a single layer of gratings reduces cost, size, weight, and complexity, near-eye display 320 shows that it is possible to multiplex multiple wavelengths through a waveguide providing for the potential of a full color image. With the ability to limit the active areas of the components that support a given wavelength range active at any given moment, there paths for crosstalk between colors in the output virtual image are reduced.

Figure 8:
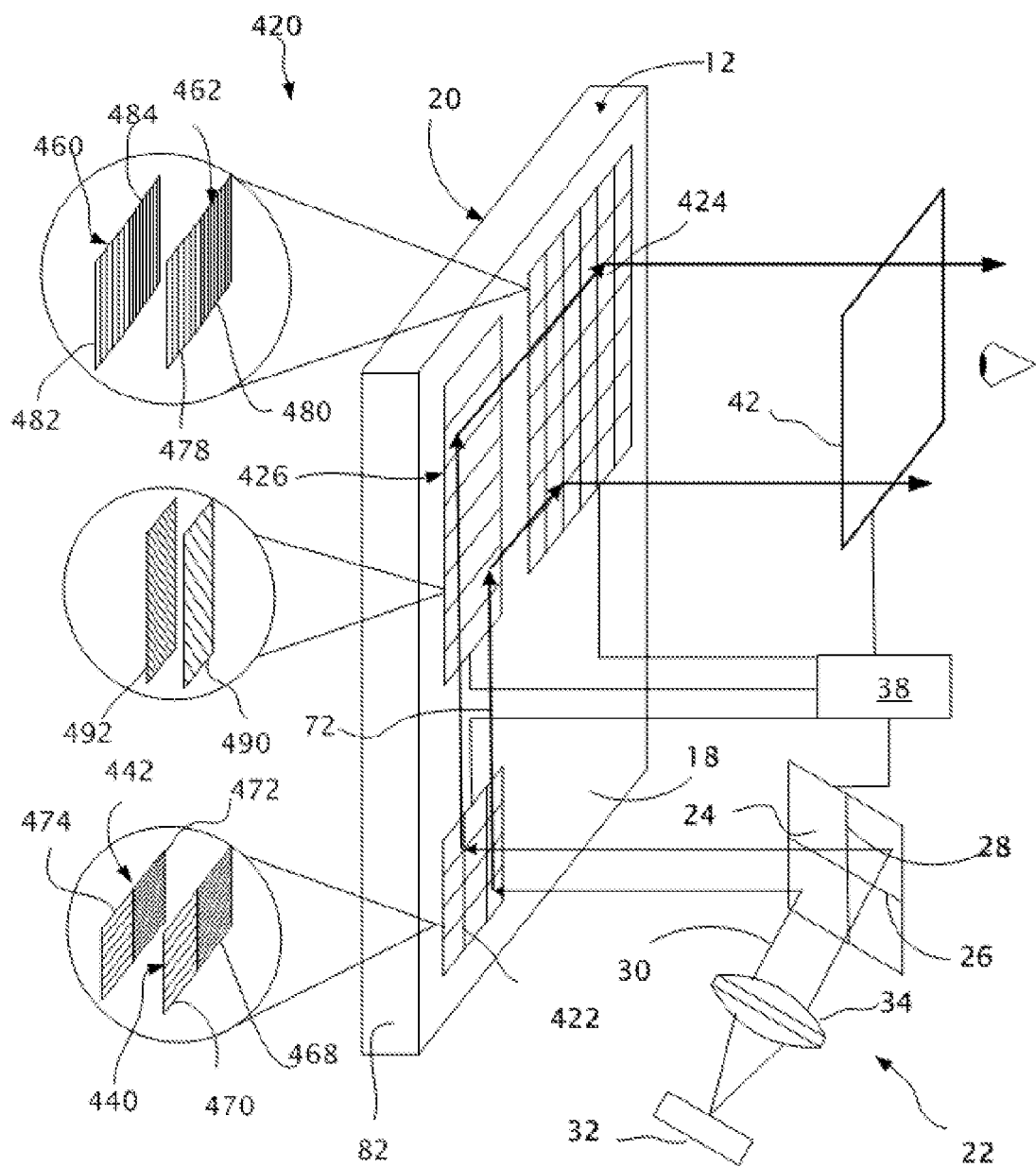
FIG. 8 is diagrammatic view of a near-eye display including a plate shaped waveguide, multiple offset gratings and multiple stacked gratings for multiplexing angular and spectral information contained in the collimated input rays.

FIG. 8 represents a further embodiment of the present invention. The near-eye display 420 is in fact a combination of near-eye displays 120 and 220. Near-eye display 420 represents a single waveguide with different ranges of beam angles and different spectral ranges multiplexed into the waveguide 12. Near-eye display 420 combines the side-by-side component pattern of multiplexing different ranges of beam angles from near-eye display 220 and the stacking of diffractive components in near-eye display 120 for the multiplexing of different spectral ranges. As pictured, stacks of two components are provided, but this is for simplicity sake. More preferably, three-component stacks are provided, one component in each stack for each of the red, green, and blue sections of the visible spectra.

Returning to the double stack, side-by-side grating stack pictured in FIG. 8, generally half the on time, or one half of the frame rate, of a display device would be devoted to one spectral range of wavelengths and the other half would be devoted to a second range of spectral wavelengths. In this instance, diffractive components 440, 490, and 462 would be active for the time when the display device generates the first range of spectral wavelengths, while diffractive components 442, 492, and 460 are inactive. During the time when the display device generates the second half of the range of spectral wavelengths, components of grating layers 442, 492, and 460 are active, while diffractive components 440, 490, and 462 are inactive.

The time duration over which the display device generates the first half of the spectral wavelengths could then be divided in half again, allowing for one half of this division (one quarter of the frame rate) to be devoted to one half of the field of angles of the virtual image that is displayed at the eyebox 42. During this time period, perhaps the left half of the field is being sent to the eye through the waveguide 12, so one or more components of the controllable grating 470 and 478 are active along with the controllable intermediate diffractive optical element layer 490. All other active gratings would be in a passive state, appearing invisible to a user, while portions of the active areas are controlled by the controller 38 in such a fashion, whether through reducing on time of certain components or by varying the voltage across said components of the various active gratings, that results in a uniform virtual image of one spectral range and one range of field angles being presented to the eyebox 42 to be received by a user's eye. In this way, each input range of angles and each range of wavelengths supported by the waveguide 12 are active for a given portion of the total frame rate of the video source.

It should be noted that a scanning source can also be synchronized with the various diffractive components through the waveguide and used in a color sequential manner so that only those components of waveguide necessary to propagating specific ray bundles through the waveguide are active at any given moment. Through control of the diffractive components, it is possible to adjust the size of the ray bundle and the relative intensity of the illumination across the range of angularly related beams. In addition, it should be noted that, depending on content, portions of the diffractive components within the waveguide could be left off to better support viewing of the ambient environment by the user.

Also, although each of these embodiments is pictured as a single monocular near-eye display, any of these could be paired with a generally mirrored image of itself and mounted to a frame in such a way that a binocular view is presented to the user. In this case, three-dimensional stereo imagery could be presented to the viewer. In addition, cameras, head tracking, and/or eye tracking could be added to the assembly, allowing for full integration as an augmented reality-viewing device.

Within an input or output aperture, multiple controllable diffractive components can be arranged in a number of different ways. For example, each controllable component can be appended to the surface of a transmissive supporting plate. These transmissive supporting plates together with their appending diffractive components can be stacked in a desired orientation with a boundary layer between each supporting plate. In the passive state, the diffractive components can form a new uninterrupted surface of their transmissive supporting plates that will allow light to pass directly through the supporting plates to the next supporting plate and into, within, or out of the waveguide. In the active state, one or more of the controllable diffractive components function as diffractive optics for diffracting light in different directions into, within, or out of the waveguide.

A conductive layer of controllable diffractive components can be patterned for variously activating different sections of the aperture, i.e., different sections of the diffractive components. That is, the different sections of the aperture can be made individually addressable so that one or more aperture sections can be switched to an active state while other aperture sections remain in a passive state using electronic controls. The electronic controls can also provide for various intermediate states in which the refractive index difference between the transformable grating structures and its contiguous mating diffractive structure can be raised or lowered to regulate diffraction efficiency. Moreover, the electronic controls can be synchronized with the injection of various image-bearing beams such as from a scanning optic so that the beams can be diffracted through different portions of the input and output apertures and for different durations. For example, the higher incident angle beams can be ejected through one component of the output aperture and the lower incident angle beams can be ejected through a different component of the output aperture for forming a larger and more uniform pupil within the eyebox using more of the available light. Image uniformity within the eyebox pupil can be further enhanced by regulating diffraction efficiency or the duration of the activation across the multiple components of the input and output apertures in synchronism with the ejection of different portions of the images (i.e., the angular constructs of the image).

Combining multiple addressable transformable gratings to create a controllable aperture allows for the selective diffraction of specific ranges of wavelengths and incident angles of the angularly related beams. The remaining image bearing light is then free to propagate to the second addressable diffractive component, which diffracts specific information and allows remaining information to propagate. The number of addressable diffractive components present in an aperture is dependent on the extent to which the incident light is to be separated. This allows for multiplexing of information within the waveguide and for optimizing the efficiency (including duration of activation) of each of the diffractive components to be optimized to a maximum efficiency for specific ranges of wavelengths and ranges of incident angles. Therefore, control over the entire visual field or recombined spectrum of the output image quality can be maximized through electronic control adjustments.

For an input aperture, the active state of a given diffractive component allows the aperture to function as a diffractive optic embedded in the surface of that particular waveguide and to direct light having a given nominal wavelength into the waveguide. In the passive state, the input aperture of that particular waveguide is open and allows the input image to be transferred to the next input diffractive component or into the ambient environment. Since the individual electrodes of the transformable gratings are addressable, specific regions of the aperture can be activated independently to diffract particular wavelengths or incident angles, allowing control over the field of view and the type of information diffracted into the waveguide. This allows multiplexing of the input image by wavelength of the light or incident angle of the beams.

For an intermediate addressable transformable grating structure, which can be used for interconnecting the input and output apertures, the active state of a given component of the transformable grating structure allows the active component to function as a diffractive optic embedded in the waveguide and to redirect the image bearing light laterally within the waveguide towards an output aperture. In the passive state, the transformable grating structure functions largely as an uninterrupted layer within the waveguide allowing light, whether it be from an ambient environmental source or image bearing light internal to waveguide, to travel largely unaffected by the transformable grating structure.

For an output aperture, the active state of a given diffractive component allows the aperture to function as a diffractive optic embedded in the surface of that particular waveguide and to eject the image bearing information from the waveguide into a desired eyebox. In the passive state of the diffractive component, the output aperture functions largely as an uninterrupted layer within the waveguide, allowing ambient environment light to pass directly through that waveguide. With a particular section of an output aperture in a passive state, image bearing light continues to travel within the waveguide where it may subsequently contact an active section of output aperture. Such an active output aperture section could be on a different layer within the same aperture, and such an active section could be further down the waveguide either on the same layer as the inactive section of output aperture or on a different layer overlying the inactive component. Since the individual electrodes of the diffractive components are addressable, one or more diffractive components overlying or laterally spaced with respect to specific regions of the output aperture can be activated independently for supporting multiplexing through the output aperture and providing control over the position of the eyebox.

While the controllable diffractive components have been described as including paired relatively transformable grating structures, other mechanisms for achieving similar diffractive performance can be used including powered holographic diffractive optics.

The invention claimed is:
1. A near-eye display comprising:
a waveguide that propagates angularly related beams by internal reflection over a limited first range of angles,
an image generator that generates angularly related beams over a second wider range of angles for forming a virtual image,
an input aperture of the waveguide including a plurality of controllable components,
each of the controllable components of the input aperture being selectively operable as a diffractive optic for injecting a subset of the angularly related beams over a limited portion of the second range of angles for propagating the subset of angularly related beams along the waveguide within the first range of angles,
together, the controllable components of the input aperture providing for injecting two or more different subsets of angularly related beams spanning the second range of angles,
an output aperture of the waveguide including a plurality of controllable components,
each of the controllable components of the output aperture being selectively operable as a diffractive optic for ejecting a corresponding subset of the angularly related beams out of the waveguide toward an eyebox,
together, the controllable components of the output aperture providing for ejecting two or more corresponding subsets of angularly related beams spanning the second range of angles,
a controller that synchronizes operation of the controllable components of the output aperture with the propagation of different subsets of angularly related beams along the waveguide for ejecting the subsets of angularly related beams out of the waveguide for presenting the virtual image within the eyebox over the second wider range of angles.

2. The near-eye display of claim 1 in which each of the controllable components of the input aperture is paired with one of the controllable components of the output aperture for injecting and ejecting one of the subsets of angularly related beams.

3. The near-eye display of claim 2 in which the controllable components of the input aperture comprise a plurality of transformable diffractive optics having different effective periods for diffracting the different subsets of angularly related beams through different angles.

4. The near-eye display of claim 3 in which the controllable components of the output aperture comprise a plurality of transformable diffractive optics having different effective periods for diffracting the different subsets of angularly related beams through different angles, the controllable components of the output aperture being transformable between a first state that is substantially transparent to the subsets of angularly related beams and a second state that diffracts the subsets of angularly related beams according to their period.

5. The near-eye display of claim 4 in which the controller transforms the controllable output components of the output aperture into the first state for supporting a view of the ambient environment from the eyebox through the output aperture of the waveguide.

6. The near-eye display of claim 1 in which the image generator is operable for generating a succession of the angularly related beams over the second wider range of angles, and the controller provides for synchronizing the operation of the controllable components of the output aperture with the operation of the image generator for sequentially ejecting the subsets of angularly related beams out of the waveguide.

7. The near-eye display of claim 1 in which the waveguide includes a front surface adjacent to the eyebox, a back surface adjacent to an ambient environment, and a length along which the angularly related beams are propagated, and the components of the input and output apertures include individually controllable segments that reside in positions that are relatively shifted with respect to each other in a direction substantially parallel to the front and back surfaces of the waveguide.

8. The near-eye display of claim 7 in which the components of the output aperture include sections arranged in a grid.

9. The near-eye display of claim 2 in which the controller synchronizes operation the paired components of the input and output apertures for injecting and ejecting the subsets of angularly related beams.

10. The near-eye display of claim 9 in which the waveguide includes a front surface adjacent to the eyebox, a back surface adjacent to an ambient environment, and a length along which the angularly related beams are propagated, and the components of the input and output apertures include components that are overlaid in a direction substantially normal to the front and back surfaces of the waveguide.

11. The near-eye display of claim 1 in which the image generator provides for generating the angularly related beams in a plurality of different nominal wavelengths, each of the controllable components of the input aperture provides for injecting a subset of the angularly related beams in one of the plurality of different nominal wavelengths, and each of the controllable components of the output aperture is operable for ejecting a corresponding subset of the angularly related beams in one of the plurality of different nominal wavelengths for overlapping the subsets of angularly related beams in the different nominal wavelengths within the eyebox.

12. The near-eye display of claim 11 in which the controllable components of the input and output apertures comprise a plurality of transformable diffractive optics that are transformable between a first state that is substantially transparent to the subsets of angularly related beams and a second state that diffracts the subsets of angularly related beams.

13. The near-eye display of claim 12 in which the controller provides for synchronizing operation of the controllable components of the input and output apertures with the operation of the image generator for sequentially ejecting the subsets of angularly related beams of different nominal wavelengths out of the waveguide.

14. The near-eye display of claim 1 further comprising an intermediate diffractive optic having controllable sections located along the waveguide between the input and output apertures for selectively reorienting the subsets of angularly related beams toward the output aperture.

15. The near-eye display of claim 14 in which the sections of the intermediate diffractive optic spatially separate the subsets of angularly related beams.

16. A waveguide of a near-eye display for conveying virtual images to a viewer's eye within an eyebox through the waveguide comprising:
a plate-shaped body having a front surface for facing an ambient environment, a back surface for facing an eyebox, and a length for propagating a limited range of angularly related beams by successive reflections from the front and back surfaces,
an input aperture of the plate-shaped body having a plurality of controllable components for collectively receiving angularly related beams over multiple wavelengths that define a pupil of a virtual image generator and for individually injecting subsets of the angularly related beams over the multiple wavelengths into the plate-shaped body within the limited range of angles,
together, the controllable components of the input aperture providing for injecting two or more different subsets of angularly related beams spanning a range of angles that is greater than the limited range of angles that can be propagated along the plate-shaped body,
an output aperture of the plate-shaped body having a plurality of controllable components for individually receiving the subsets of angularly related beams over the multiple wavelengths and for collectively ejecting the subsets of angularly related beams over the multiple wavelengths from the waveguide,
each of the controllable components of the input and output apertures comprising a transformable diffractive optic that is transformable between a first state that is substantially transparent to the subsets of angularly related beams over the multiple wavelengths and a second state that diffracts one or more of the subsets of angularly related beams over the multiple wavelengths, and
a controller that synchronizes transformations of the controllable components of the input and output apertures for sequentially injecting and ejecting the subsets of angularly related beams over the multiple wavelengths within an integration interval of the viewer's eye for collectively re-forming the pupil of the virtual image generator within the eyebox.

17. The waveguide of claim 16 in which the controllable components of the input aperture provide for sequentially injecting the subsets of angularly related beams in different wavelengths, and the controllable components of the output aperture provide for sequentially ejecting corresponding subsets of the angularly related beams in the different wavelengths within the integration interval of the viewer's eye for collectively re-forming the pupil of a color virtual image generator within the eyebox.

18. The waveguide of claim 17 in which the controllable components of the input and output apertures include components that are stacked in a direction substantially normal to the front and back surfaces of the waveguide.

19. The waveguide of claim 16 in which the controller provides for transforming the controllable output components of the output aperture between the first and second states for simultaneously supporting both a view of the ambient environment and a view of a virtual image produced by the virtual image generator from within the eyebox.

20. The waveguide of claim 19 in which the controllable components of the output aperture include components that reside in positions that are relatively shifted with respect to each other in a direction substantially parallel to the front and back surfaces of the waveguide.

21. The waveguide of claim 20 in which the controller maintains at least one of the relatively displaced components of the output aperture in a first state for supporting the view of the ambient environment within the eyebox while transforming at least one other of the relatively displaced components of the output aperture into the second state for supporting the view of the virtual image within the eyebox.

22. The waveguide of claim 19 in which the controllable components of the output aperture are cycled between the first and second states within the integration interval of the human eye for presenting overlapping views of the ambient environment and the virtual image from the eyebox.

23. The waveguide of claim 16 in which further comprising an intermediate diffractive optic that includes controllable diffractive components for separately diffracting the angularly related beams in different wavelengths.

24. The waveguide of claim 17 in which the controllable diffractive components of the intermediate diffractive optic include controllable sections located along the plate-shaped body between the input and output apertures for selectively reorienting the subsets of angularly related beams toward the output aperture.

25. The waveguide of claim 16 in which the controllable components of the input and output apertures comprise a plurality of transformable diffractive optics having different effective periods for diffracting the different subsets of angularly related beams through different angles.

26. The waveguide of claim 25 in which the transformable diffractive optics include transformable grating structures paired with mating grating structures within individual components of the input and output apertures, and the transformable grating structures comprise an electro-active material having an index of refraction that can be varied from a value that substantially matches an index of refractive index of the paired mating grating structures to another value that does not substantially match the refractive index of the paired mating grating structures for transforming the controllable components between the first and second states.

27. A method of relaying an exit pupil of an image generator through a waveguide to an eyebox for presenting a virtual image to a viewer comprising steps of:
generating angularly related beams over a range of angles that form an exit pupil of an image generator,
locating an input aperture of a waveguide proximate to the exit pupil of the image generator for receiving the angularly related beams,
transforming controllable components of the input aperture between a first state that is substantially transparent to the angularly related beams and a second state that diffracts the angularly related beams for individually injecting subsets of the angularly related beams into the a waveguide for propagation along the waveguide within a limited range of angles,
together, the controllable components of the input aperture providing for injecting two or more different subsets of angularly related beams spanning a range of angles that is greater than the limited range of angles that can be propagated along the plate-shaped body, locating an output aperture of the waveguide proximate to an eyebox, and transforming controllable components of the output aperture between the first state that is substantially transparent to the angularly related beams and the second state that diffracts the angularly related beams for individually ejecting the subsets of the angularly related beams from the waveguide into the eyebox over a range of angles that re-form the exit pupil of the image generator within the eyebox.

28. The method of claim 27 in which the steps of transforming include timing durations of transformations of the controllable components of at least one of the input and output apertures among the first and second states for balancing intensities across an image field that is viewable at the re-formed exit pupil.

29. The method of claim 27 in which the steps of transforming include controlling diffraction efficiencies of the second states of the controllable components of at least one of the input and output apertures for balancing intensities across an image field that is viewable at the re-formed exit pupil.

30. The method of claim 27 in which the step of generating includes generating angularly related beams over a range of wavelengths that form the exit pupil of the image generator as a color image generator, and the steps of transforming include diffracting the angularly related beams in different wavelengths for individually injecting subsets of the angularly related beams in the different wavelengths into the a waveguide for propagation along the waveguide within the limited range of angles and diffracting the angularly related beams for individually ejecting the subsets of the angularly related beams in the different wavelengths from the waveguide into the eyebox over the range of angles and wavelengths that re-form the exit pupil of the color image generator within the eyebox.

31. The method of claim 30 in which the steps of transforming include transforming successive pairs of in the individually controllable components of the input and output apertures for sequentially injecting and ejecting the individual subsets of the angularly related beams in the different wavelengths.

32. The method of claim 27 further comprising a step of reorienting the subsets of the angularly related beams propagating along the waveguide toward the output aperture with an intermediate diffractive optic.

33. The method of claim 32 the input aperture spatially separate the subsets of angularly related beams in one dimension and components of the intermediate diffractive optic spatially separate the subsets of angularly related beams in a second dimension.

34. The method of claim 32 in which the step of reorienting includes transforming controllable components of the intermediate diffractive optic between a first state that is substantially transparent to the angularly related beams and a second state that diffracts the angularly related beams for individually reorienting subsets of the angularly related beams propagating along the waveguide from the input aperture to the output aperture.

35. The method of claim 27 in which the limited range of angles over which the waveguide supports propagation of the angularly related beams is less than the range of angles that form the exit pupil of the image generator.

* * * * *